United States Patent [19]

McMurtry

[11] Patent Number: 4,933,868

[45] Date of Patent: Jun. 12, 1990

[54] ROTARY CUTTING TOOL

[75] Inventor: David R. McMurtry, Wotton-Under-Edge, United Kingdom

[73] Assignee: Renishaw, plc, Great Britain

[21] Appl. No.: 216,627

[22] PCT Filed: Nov. 9, 1987

[86] PCT No.: PCT/GB87/00794
§ 371 Date: Jul. 7, 1988
§ 102(e) Date: Jul. 7, 1988

[87] PCT Pub. No.: WO88/03672
PCT Pub. Date: May 19, 1988

[30] Foreign Application Priority Data

Nov. 7, 1986 [GB] United Kingdom ............... 8626594

[51] Int. Cl.$^5$ .................... B23B 51/00; G01B 7/02
[52] U.S. Cl. .................... 364/474.02; 364/474.37; 364/474.12; 408/13; 408/147; 408/156; 408/173
[58] Field of Search ............ 364/474.01, 474.02, 364/474.03, 474.06, 474.12, 474.37; 408/3, 8, 10, 11, 13, 146, 147, 154, 156, 173, 180, 125, 191, 241 R

[56] References Cited

U.S. PATENT DOCUMENTS

| | | | |
|---|---|---|---|
| 3,914,678 | 10/1975 | Chynoweth et al. | 318/568 |
| 3,923,414 | 12/1975 | Hopkins | 408/143 |
| 3,937,586 | 2/1976 | Watson | 408/147 |
| 3,938,626 | 2/1976 | Hopkins | 188/1 B |
| 4,000,667 | 1/1977 | Hopkins | 76/101 R |
| 4,204,782 | 5/1980 | Spits et al. | 408/3 |
| 4,211,510 | 7/1980 | Hopkins | 408/186 |
| 4,294,546 | 10/1981 | Killmann et al. | 356/399 |
| 4,343,576 | 8/1982 | Lagerholm et al. | 408/173 |
| 4,400,118 | 8/1983 | Yamakage et al. | 408/3 |
| 4,432,258 | 2/1984 | Currer | 82/1.2 |
| 4,447,177 | 5/1984 | Ochiai et al. | 408/161 |
| 4,451,892 | 5/1984 | McMurtry | 364/474 |
| 4,489,629 | 12/1984 | D'Andrea et al. | 82/1.2 |
| 4,507,850 | 4/1985 | Kielma | 29/568 |

(List continued on next page.)

FOREIGN PATENT DOCUMENTS

| | | |
|---|---|---|
| 0043920A1 | 1/1982 | European Pat. Off. . |
| 0105979 | 10/1982 | European Pat. Off. . |
| 2126164 | 12/1971 | Fed. Rep. of Germany . |
| 2645426 | 4/1978 | Fed. Rep. of Germany . |
| 2758742 | 7/1979 | Fed. Rep. of Germany . |
| 3408352 | 3/1984 | Fed. Rep. of Germany . |
| 3416217 | 5/1984 | Fed. Rep. of Germany . |
| 3300877 | 7/1984 | Fed. Rep. of Germany . |
| 3426548 | 7/1984 | Fed. Rep. of Germany . |
| 3448088 | 7/1984 | Fed. Rep. of Germany . |
| 3408348 | 9/1985 | Fed. Rep. of Germany . |
| 2618928 | 4/1976 | Netherlands . |
| 471185 | 8/1975 | U.S.S.R. . |
| 667002 | 2/1952 | United Kingdom . |
| 818816 | 8/1959 | United Kingdom . |
| 834126 | 5/1960 | United Kingdom . |
| 840031 | 7/1960 | United Kingdom . |
| 840274 | 7/1960 | United Kingdom . |
| 948388 | 10/1960 | United Kingdom . |
| 853113 | 11/1960 | United Kingdom . |
| 923620 | 10/1961 | United Kingdom . |
| 934316 | 8/1963 | United Kingdom . |
| 1215822 | 2/1968 | United Kingdom . |
| 1356156 | 5/1971 | United Kingdom . |
| 2131332 | 1/1983 | United Kingdom . |
| 2128509 | 7/1983 | United Kingdom . |

OTHER PUBLICATIONS

"Wear Compensation When Producing High-Precision Bores" Ind. & Prod. Eng.
"Growth Rate Slows, But Newcomers Joins the Race" The ind. Robot 12/85.
"A Planor XY Robotic Fine Positioning Device" Computer Society Press.

Primary Examiner—Jerry Smith
Assistant Examiner—Paul Gordon
Attorney, Agent, or Firm—Oliff & Berridge

[57] ABSTRACT

A cutting tool includes a motor and control inside the cutting tool for adjusting the cutting radius of the cutting tool. The cutting tool is adaptable for use with machine tools which do not include integral systems for moving parts of the cutting tool adjust the cutting radius.

12 Claims, 9 Drawing Sheets

U.S. PATENT DOCUMENTS

| | | | |
|---|---|---|---|
| 4,551,044 | 11/1985 | Schultschik | 408/185 |
| 4,561,776 | 12/1985 | Pryor | 356/72 |
| 4,576,068 | 3/1986 | Glatthorn | 82/1.4 |
| 4,590,828 | 5/1986 | Sullivan | 82/24 R |
| 4,593,277 | 6/1986 | Langan | 340/680 |
| 4,605,346 | 8/1986 | Trevarrow | 408/147 |
| 4,607,549 | 8/1986 | Krempel | 82/2 E |
| 4,611,958 | 9/1986 | Vasilchenko | 408/168 |
| 4,617,846 | 10/1986 | Horsch | 82/1.2 |
| 4,636,960 | 1/1987 | McMurtry | 364/474 |
| 4,643,622 | 2/1987 | Winski | 409/84 |
| 4,716,657 | 1/1988 | Collingwood | 33/561 |
| 4,741,230 | 5/1988 | Bohner et al. | 82/1.2 |
| 4,761,102 | 8/1988 | Pfalzgraf | 408/157 |

ROTARY CUTTING TOOL

FIELD OF THE INVENTION

This invention relates to rotary cutting tools, more specifically to tools comprising a body having an axis of rotation, a tool bit support supported on the body for displacement relative thereto and transversely to said axis. The invention also relates to the combination of such a tool with a machine having a spindle to which the tool is securable for performing a cutting operation on a workpiece.

BACKGROUND OF THE INVENTION

It is known to provide a rotary cutting tool having a cutting radius adjustable by a motor. However, the adjustment of the cutting radius is controlled by a control external of the tool. A dedicated form of connection between the spindle of the machine tool to which the tool is connected, and the tool itself is thus required to transmit the control signals to a motor, in order to cause the motor to effect adjustment of the tool. Such tools are not therefore retrofittable into the spindles of existing machines. Moreover machine tools with dedicated connections on the spindle are expensive to manufacture.

SUMMARY OF THE INVENTION

A first aspect of the present invention provides a rotary cutting tool for mounting on a spindle of a machine tool. A base for attaching the tool to the spindle of the machine tool, the base having an axis of rotation. A support is provided for a tool bit, the support being connected to the base. The support is displacable perpendicular to the axis of the base and means are provided for determining the magnitude of displacment of the support. The cutting tool includes a receiver for position demand data, which data relates to the magnitude of the displacement of the support. A motor is provided for displacing the support perpendicular to the axis of the base. A tool controller is included for actuating the motor in accordance with the position demand data.

It is generally an object of this invention to provide a said tool having its own independent means of adjusting the position of the tool bit support relative to said axis and to provide a method of operating a machine in which such a tool is provided. The scope of the invention is specified in the claims hereto.

BRIEF DESCRIPTION OF THE DRAWING

An example of the different aspects of this invention and modifications thereof will now be described with reference to the accompanying drawings wherein.

DESCRIPTION OF THE PREFERRED EMBODIMENT

Figure 1:
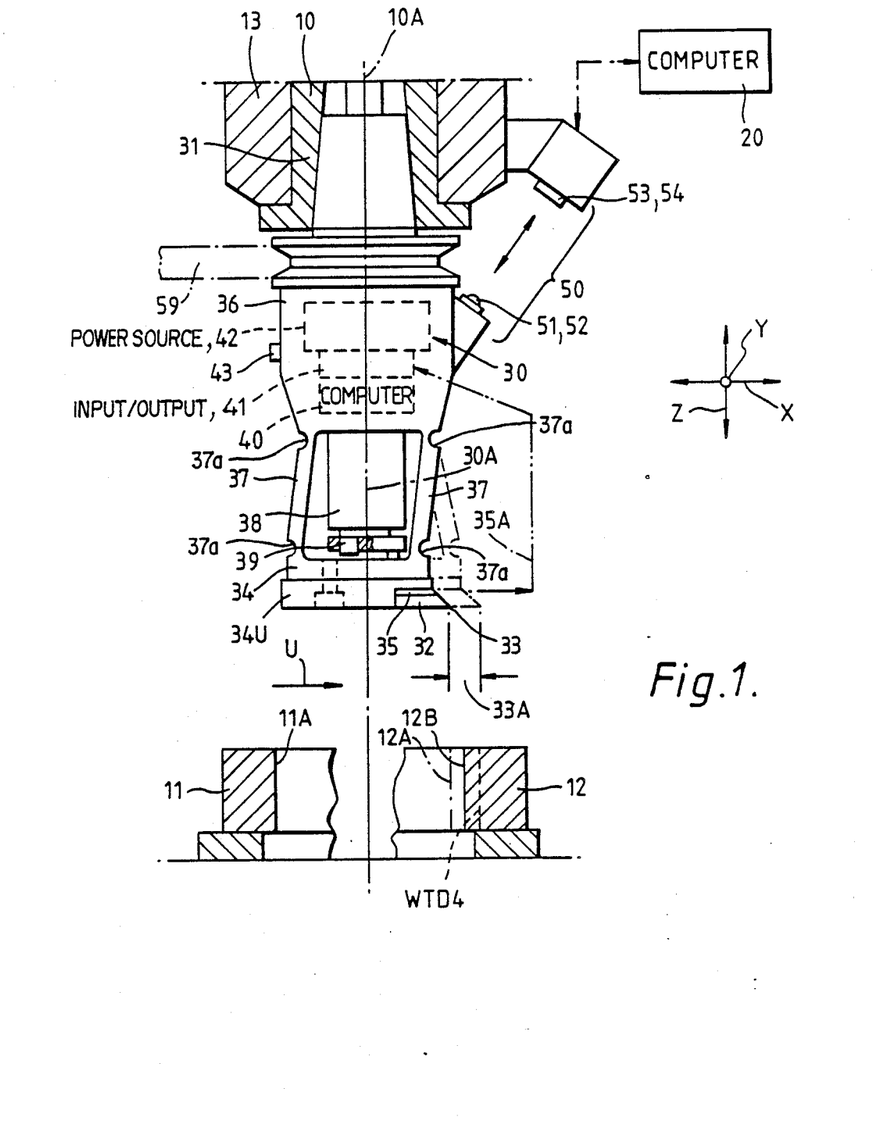
FIG. 1 is a part-sectional elevation of a part of a boring machine and a boring tool connected thereto.
Figure 5:
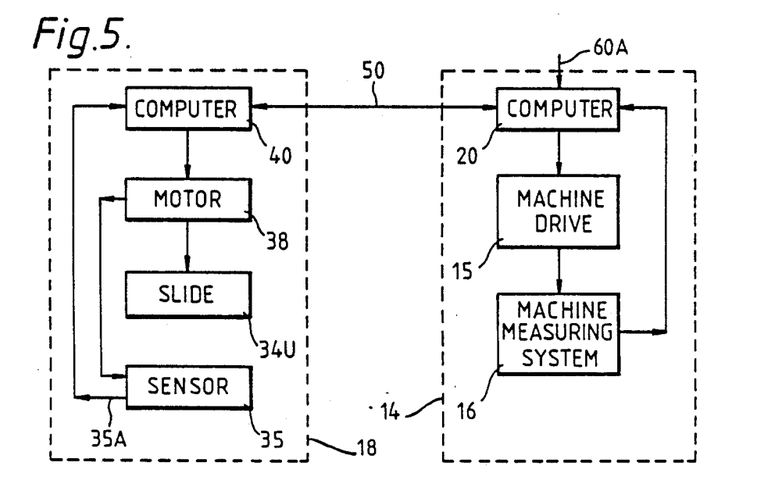
FIG. 5 is a system diagram.

Referring to FIG. 1, there is shown a boring tool 30 connected by a taper 31 to a spindle 10 which is supported for rotation about an axis 10A and for translation in directions X,Y,Z, all relative to a workpiece 12. The spindle 10 is part of a machine including a first computer 20 for controlling the movements of the spindle and for other purposes to be described. The machine, being well-known per se, is not illustrated other than in the system diagram of FIG. 5 which shows a spindle positioning system 14 comprising the computer 20, a machine drive 15 being motors for effecting the movements of the spindle 10 relative to a datum which may be a surface of the workpiece 12, and a machine measuring system 16 for monitoring the position of the spindle.

Figure 1A:
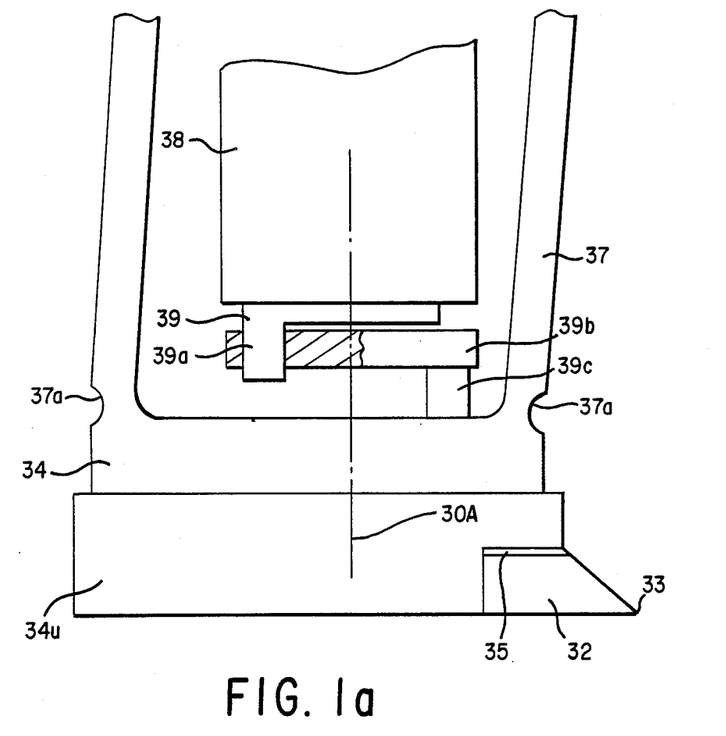
FIG. 1a is a part view of the movable member of FIG. 1.

The tool 30 comprises a cutting bit 32 having a tip 33. The bit 32 is secured to a member 34 through the intermediary of a piezo element 35 adapted to produce an output signal 35A when the tip 33 engages a gauge 11 or the workpiece 12. Thus the bit 32 also constitutes a sensing member for sensing forces acting on it and the piezo element constitutes a transducer for those forces. The member 34 is supported on a base or housing 36 by a pair of parallel links 37 (having elastically deformable flexural regions 37a) for movement in a direction U transverse to an axis 30A of the tool, the axis 30A being aligned with the axis 10A of the spindle. The movement of the member 34 is effected by a stepper motor 38 whose stator is secured to the housing and which has a crank and connecting rod arrangement 39 for moving the member 34 comprising (FIG. 1a) a crank pin 39a, a connecting rod 39b, and connecting pin 39c. A slide 34U connected between the bit 32 and the member 34 allows manual adjustment of the bit 32 relative to the member 34 in the direction U. The housing 36 includes a second computer 40 having an input-output unit 41 and a power supply 42 both within the housing 36. The computer 40, motor 38, slide 34U, and sensor 35 constitute a tool bit positioning system 18; see also FIG. 5.

The computers 20,40 are connected by a wireless two-way communication link 50 comprising for example transmitting and receiving photo diodes 51,52 provided at the exterior of the housing 36 and connected to the input-output unit 41, and transmitting and receiving diodes 53,54 provided on a spindle housing 13 and connected to the computer 20.

Figure 3:
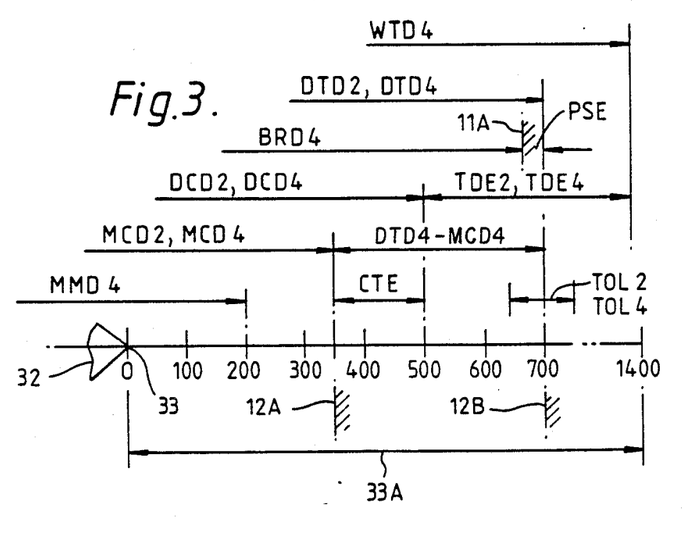
FIG. 3 is a diagram showing positions of a bit of the boring tool to an enlarged scale.
Figure 4A:
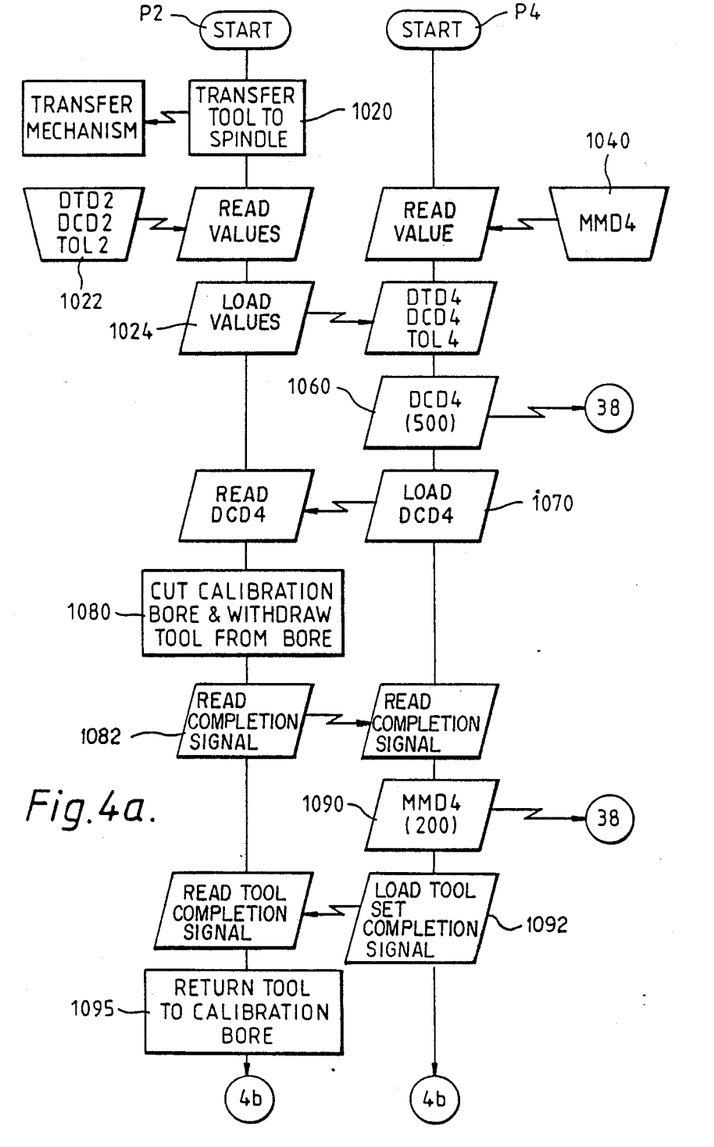
FIG. 4a to 4e are a flow diagram of computer operations.
Figure 4B:
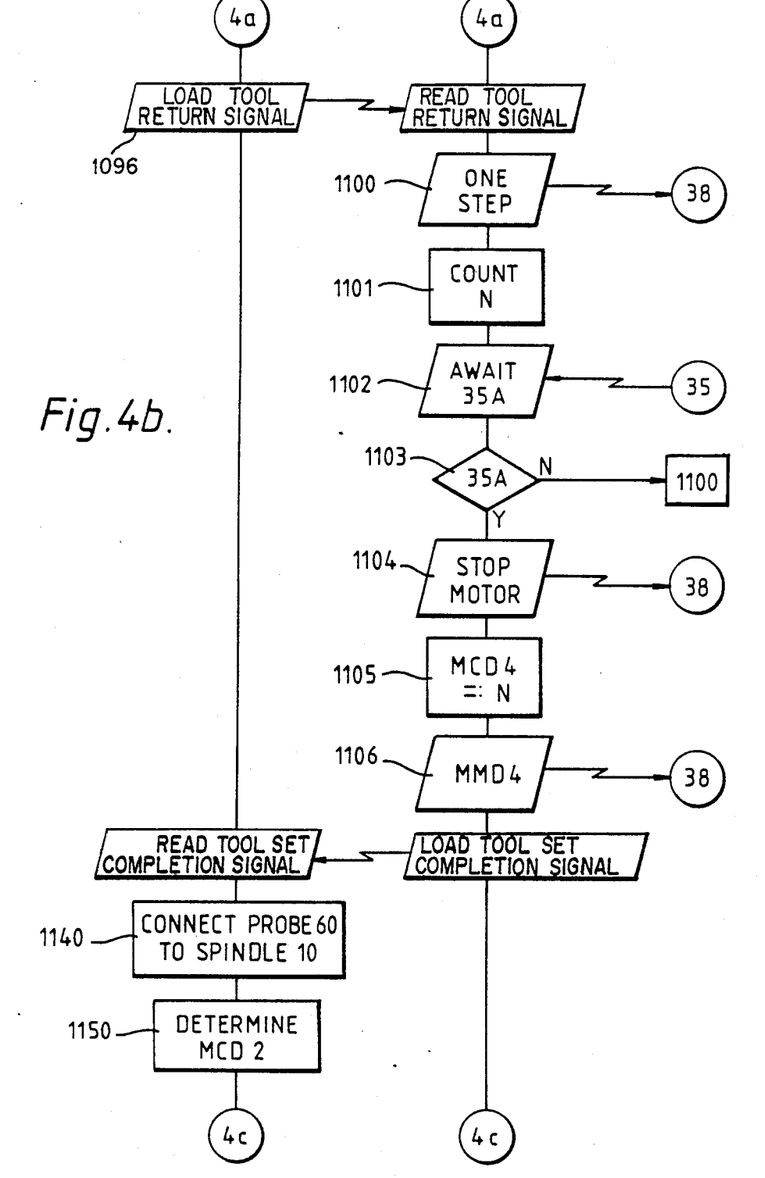
Figure 4C:
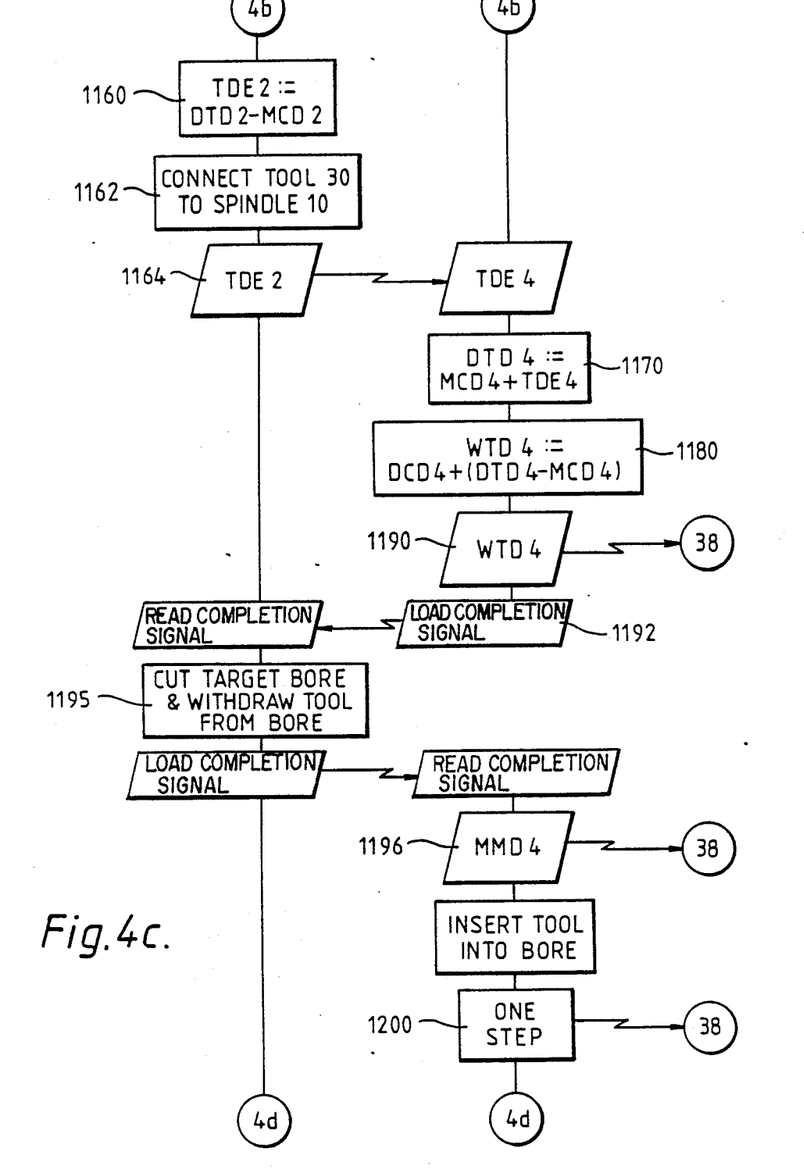
Figure 4D:
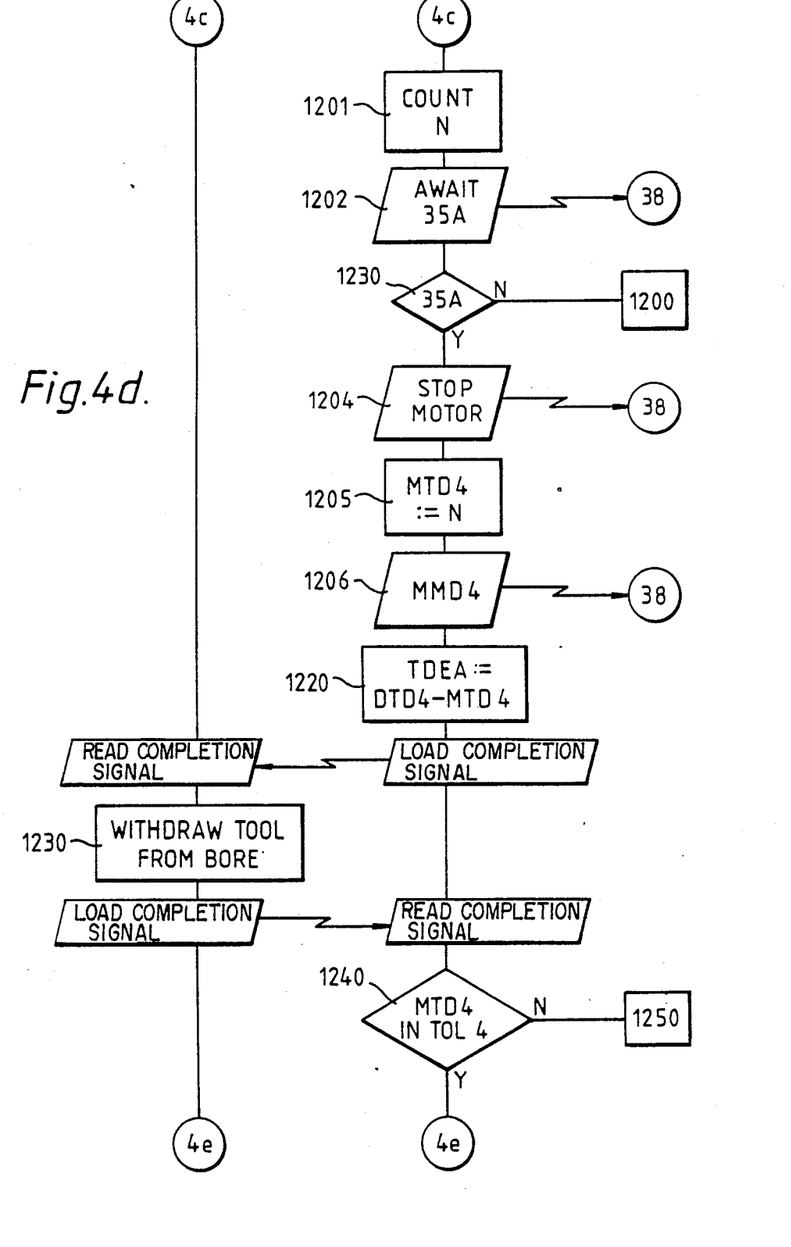
Figure 4E:
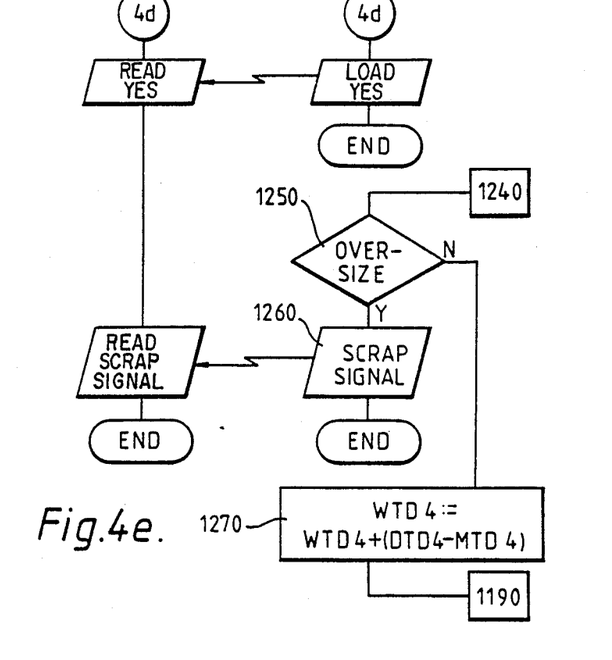

The computer 20 communicates with the computer 40 by signals representing either an operating instruction, or data, or instructions which define a position which the tip 33 is to adopt. Any such latter instruction is converted by the computer 40 into a number of steps the motor needs to move the tip 33 to a said position. Typical such positions and the corresponding number of steps of the motor are shown in FIG. 3 as positions denoted 0, 200, 500, 700, 900, 1200, 1400. The Position "200" represents 200 steps of the motor away from the position "0", and so on for the other positions. Conveniently, the motor is arranged for one step thereof to represent a movement of 0.5 micron (micron=micrometer) of the tip 33. The total range, 33A, of movement of the tip is therefore 1400*0.5=700 micron=0.7 mm. Thus each step of the motor represents a 0.5 micron change on radius or a 1 micron change on diameter of a circle swept by the tip 33. A measurement defined in terms of the position of the motor 38 or the tip 33 is hereinafter also referred to as a "comparative" measurement distinct from an "absolute" measurement which is given in units such as micron.

Figure 2:
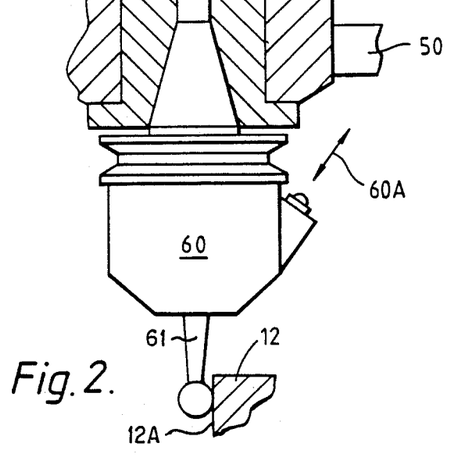
FIG. 2 is a part view of the machine similar to FIG. 1 but shows a probe attached to the machine.

A transfer mechanism indicated 59 is adapted to disconnect the tool 30 from the spindle 10 and replace it by a probe 60 (FIG. 2), and vice versa. The spindle 10 is movable to engage a stylus 31 of the probe with a surface 12A of the workpiece 12 and responsive to which the probe is adapted to output a pulse signal 60A transmittable optically to the receiving diode 54.

The use of the machine for machining a bore of given diameter requires a procedure involving programs P2 and P4 provided respectively in the computers 20 and 40. An outline of the operations involved in machining a bore of a demanded target diameter DTD2 (FIG. 3) is as follows:

A. Manually actuating the motor 38 to move the tip 33 to a comparative reference diameter DTD4 (FIG. 3), e.g. the position 700, lying within the range 33A.

B. Manually adjusting the slide 34U to bring the tip 33 to a manual demanded target diameter BRD4 e.g. by means of the gauge 11. The manually set diameter of the tip 33 now corresponds approximately to the diameter of guage 11 subject only to a pre-setting error PSE.

C. Manually loading the value of an absolute demanded target diameter DTD2 into the program P2.

D. Retracting the tip 33 to a position, e.g. 500, defining a comparative demanded calibration diameter DCD4 and cutting a calibration bore. The comparative demanded calibration diameter DCD4 is arranged to lie well clear of any tolerance TOL4 of the absolute target diameter DTD2 as represented by the position 700.

E. Measuring the actual diameter of the calibration bore 12A with the tip 33 and comparing the resulting measured comparative calibration diameter MCD4 with the comparative demanded calibration diameter DCD 4 to establish a first cutting error CTE in terms of the number of motor positions between DCD 4 and MCD 4. This error takes account of such error sources as tool deflection and centrifugal force.

F. Measuring the diameter of the calibration bore by means of the probe 60 in absolute terms and comparing this probe-measured absolute calibration diameter MCD2 with the absolute demanded target diameter DTD2 to establish an absolute target diameter error TDE2. The diameter of the calibration bore 12A, hitherto known only in comparative terms is now known in absolute terms. The use of the probe 60 may involve a manouvre requiring a transverse displacement of the spindle 10 and the eventual return of the spindle to the center of the calibration bore, i.e. the manouvre is subject to a repeatability error of spindle position. However, the tool can be aligned with centre of the bore 12A by a centering procedure known per se.

G. Transferring the absolute target diameter error TDE2 from the program P2 to the program P4 which converts this actual value into a corresponding comparative target diameter error, and adding the latter to the value demanded of the calibration diameter DCD4 to establish a comparative demanded target diameter TDE4. This position value is now the standard of demanded target diameter against which the tool 30 can measure the diameters produced by later cutting operation.

H. Adding the cutting error CTE to the comparative demanded calibration diameter TDE4 to establish a comparative weighted target diameter WTD4 which is a diameter taking account not only of the absolute target diameter error TDE but now also of the cutting error CTE.

I. Performing a cutting operation with the weighted target diameter position WTDA of the tip 33 to produce the enlarged bore 12B.

J. Using the tool 30 to measure the comparative diameter DTD4 of the bore 12B.

K. If necessary performing further cutting and comparative measuring operations until the comparative demanded target diameter is attained. The programs P2,P4 will now be described in detail (FIGS. 3 and 4a-4e).

The program P2 has the following variables:
DCD2=absolute demanded calibration diameter.
MCD2=absolute calibration diameter as measured by the probe 60 and the program P2.
DTD2=absolute demanded target diameter.
TDE2=absolute target diameter error being the difference DTD2-MCD2.
TOL2=a tolerance for DTD2.

The program P4 has the following variables:
DCD4=comparative demanded calibration diameter equivalent to position 500.
MPD4=comparative measured calibration diameter as measured by tool 30.
DTD4=comparative demanded target diameter also equivalent to position 700.
WTD4=comparative weighted target diameter as determined by computer 40.
MMD4=comparative minimum measuring diameter equivalent to position 200.
TDE4=comparative target diameter error as determined by computer 40.

Pre-Setting

The operator presses a switch button 43 on the housing 38 responsive to which the computer 40 steps the motor 38 automatically to a position intermediate between the ends of the range 33A, say a position at which the motor 38 has made 700 steps from zero (FIG. 3). Thereafter the slide 34 is adjusted manually for the tool tip 33 to have a position BRD4, as nearly as possible to the absolute demanded target diameter DTD2. To this end the tool 30 may be mounted in a jig (not shown) which simulates the spindle and which includes the gauge 11 (FIG. 1), the slide 34U being moved by the operator until the tip 33 touches the internal diameter surface 11A of the gauge. The surface 11A defines a manual calibration surface. The value BRD4 may differ from the value DTD2 by an error PSE (FIG. 3).

Calibration

The tool 30 is placed into a tool store (not shown) of the machine and the program P2 is initiated by an operation to transfer the tool into the spindle (step 1020). Manually preset values of DTD2,DCD2 and TOL2 are read into program P2 (step 1022) and are loaded, at step 1024, into the program P4 where they are converted into corresponding positions of the motor 38 so that now these value carry the designations DTD4, DCD4 and TOL4. A manually preset value of MMD4 is read into program P4 (step 1040). A step 1060 of program P4 instructs the computer 40 to move the motor 38 to the comparative demanded calibration diameter DCD4, which is in this case equivalent to the motor step position 500.

The attaining of the position 500 is confirmed back to program P2 at step 1070. The computer 20 then effects the machining of a calibration bore 12A in the work piece, using the DCD4 position of the tool 30 (step 1080). The latter position is 200 motor steps below the 700 motor step position defining the demanded target diameter DTD4, and the arrangement is such that the DCD4 position is less than any lower tolerance TOL4 by which the demanded target diameter DTD4 may vary. The completion of the calibration bore is signalled by program P2 to program P4 (step 1082) which responds by setting the tool to the comparative minimum measuring diameter MMD4 which is equivalent to position 200 (step 1090). The latter step is signalled to program P2 (step 1092) which responds by returning the tool 30 to the calibration bore and signals program P4 accordingly (steps 1095,1096). The program P2 responds by going into a measuring operation comprising extending the tool bit 32 by moving the motor 38 by one step toward the wall of the calibration bore (step 1100), counting the number N of the motor steps (step 1101) and awaiting the signal 35A (step 1102) which is due to occur when the tip 33 engages the wall of the bore. A decision 1103 tests whether the signal 35A has been received; if "no" the program returns to step 1100; if "yes" the program stops the motor 38 (step 1104) and sets MCD4 to the current value of N (step 1105), i.e. the measured calibration diameter MCD4 is equivalent to the position N which the motor had at the instant of the signal 35A. This measurement is independent of the absolute demanded calibration diameter DCD2 and substantially takes account of a cutting error CTE, i.e. takes account of the effects of deflection under load, and the effect of centrifugal force, occuring during cutting. Finally, the program P4 returns the tool 30 to the minimum measuring diameter MMD4 (step 1106).

Next the program P2 operates the tool changer to connect the probe 60 to the spindle (step 1140) and operates the machine to perform a maneuver (known per se from British Patent No. 2,108,751, or U.S. Pat. No. 4,542,287, our Ref: 29) for determining the absolute measured calibration diameter MCD2 (step 1150). The program P2 then determines the absolute target diameter error TDE2 as the difference between the absolute demanded target diameter DTD2 and the absolute measured calibration diameter MCD2 (step 1160). The program P2 then returns the tool 30 to the spindle 10 (step 1162) and transmits the value of TDE2 to the program P4 where TDE2 is converted into the value TDE4. The value TDE4 defines the amount by which the calibration bore 12A has to be enlarged to attain the target diameter DTD4. Responsive to step 1162 the program P4 re-establishes the comparative demanded target diameter DTD4 by forming the sum MCD4+TDE4 (step 1170). The measurement of the calibration bore 12A by the probe 60 under the control of the program P2 eliminates any error PSE that may have occurred during pre-setting.

However, if it is not desired to use the probe 60, the tool 30 itself may be used as probe for determining diameter in absolute terms. In that case the computer 40 is adapted to transmit the signal 35A to the computer 20 and the machine can then determine the diameter by manouvres such as those described in said British or U.S. Patents.

To ensure that both the cutting error CTE and the target diameter error TDE2 are taken into account for tool position, step 1180 forms the weighted target diameter WTD4 as the sum of the values DCD4 and TDE4, the value TDE4 being in terms of the difference DTD4–MCD4. The value WTD4 is then output to the motor 38 (step 1190) and completion of this operation is signalled to the program P2 (step 1192).

Producing the First Target Bore

A new cutting operation is then carried out (step 1195) whereby to enlarge the calibration bore 12A to the target bore 12B or a near approximation thereof. Thereafter the tool 30 is used to measure the new bore size at steps 1200 to 1204 similar to steps 1100 to 1104 mentioned above. On receipt of the signal 35A. the motor 38 is stopped (step 1204). the value of the number N of steps made by the motor 38 is stored as the value MTD4 (step 1205), and the motor 38 is operated to retract the tool (step 1206). Thereafter the program P4 calculates the new target diameter error TDE4 by the operation TDE4=DTD4-MTD4 (step 1220). Next the program P4, after causing withdrawal of the tool 30 from the bore (step 1230), determines whether TDE4 lies within the tolerance TOL4 (step 1240) stored in the computer 40. If "yes" the program goes to an end point; if "no" the program goes on to determine whether the bore is oversize (step 1250). If "yes" again, there is output an appropriate "scrap" signal (step 1260) before going to "end"; if "no" the program P4 goes to step 1270 to calculate a new value WTD4 on the basis of the difference between the demanded target diameter DTD4 and the last measured target diameter MTD4. A further boring operation is now necessary and the program returns to step 1190.

Figure 6:
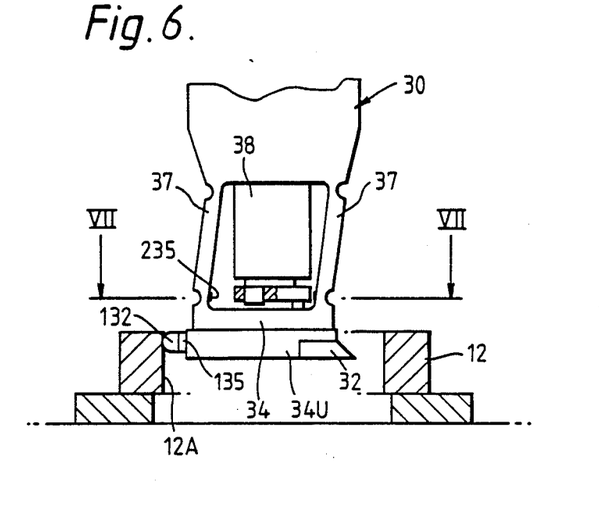
FIG. 6 shows a detail of FIG. 1 embodying a modification.
Figure 7:
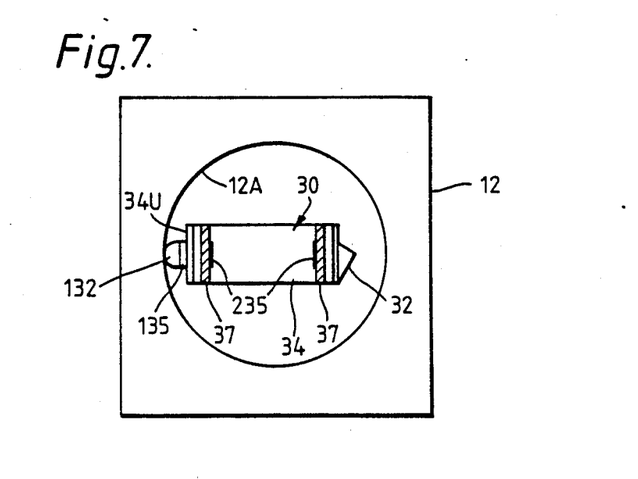
FIG. 7 is a section on line VII—VII in FIG. 6.

In a modification (FIGS. 6,7) the sensing member is constituted by a projection 132 provided on the slide 34U at the end thereof opposite the tool bit 32. The projection 132 is adapted to engage a surface, e.g. 12A, to be measured by operation of the motor 38. The member 132 may be connected to the slide 34U by a piezo element 135 for transducing the forces acting on the element 135 when engaging the surface to be measured. A measuring operation with the projection 132 comprises stepping the motor 38 backwards, i.e. in the sense moving the tip 33 away from the surface, but otherwise the operation is, in principle, the same as for sensing by the tool bit 32.

In a further modification (FIG. 7) the piezo elements 35 or 135 are replaced by strain gauges 235 in the links 37.

I claim:

1. A rotary cutting tool for mounting on a spindle of a machine tool, comprising:
    a base for attaching the tool to the spindle of the machine tool, the base having an axis of rotation;
    a support for a tool bit, the support being connected to the base;
    means within the tool permitting displacement of the support perpendicular to the axis of the base;
    means within the tool for determining the magnitude of the displacement of the support;
    means within the tool for receiving position demand data, the data relating to a demanded magnitude of the displacement of the support;
    a motor within the tool for displacing the support perpendicular to the axis; and
    a tool control within the tool for actuating the motor in accordance with the said data.

2. A tool according to claim 1 further comprising a power source provided within the tool for powering the motor.

3. A tool according to claim 2 further comprising sensing means connected to the support for sensing the surface of a workpiece, and for generating a sensor signal upon attaining a predetermined spatial relationship with the workpiece surface, the sensor signal causing the tool control to read the position of the support.

4. A tool according to claim 1 wherein the motor is a stepper motor, and the position of the support relative to the axis of the base is determined by the tool control in terms of the number of motor steps from a reference position.

5. A tool according to claim 4, wherein the position demand data defines the position of the support in terms of the number of steps of the motor.

6. The combination of a cutting tool according to claim 1 with a machine tool having a spindle to which the cutting tool is securable, means for positioning the spindle relative to a datum, a machine measuring system for measuring the position of the spindle relative to said datum, and a machine control for generating position demand data for transmission to the receiving means.

7. A combination according to claim 6 wherein the tool further comprises sensing means connected to the support for sensing the surface of a workpiece, and for generating a sensor signal upon attaining a predetermined spatial relationship with the workpiece surface, the sensor signal causing the tool control to read the position of the support.

8. A combination according to claim 7 comprising: wireless transmitting means for transmitting data relating to the position of the support from the tool control to the machine control.

9. A combination according to claim 6 further comprising wireless transmitting means for transmitting the position demand data from the machine control to the receiving means.

10. A method of machining a bore in a workpiece, using a rotary cutting tool mounted to the spindle of a machine tool, the cutting tool having an adjustable cutting radius and means for measuring the cutting radius, the method comprising the steps of:
   setting the tool cutting radius to a first value;
   machine a bore in a workpiece;
   measuring, with the tool, the actual radius of the first bore, by keeping the machine tool spindle stationary, adjusting the tool radius to bring the tool into a predetermined spatial relationship with the surface of the bore and measuring the cutting radius of the tool upon attainment of the said relationship;
   determining an offset value of radius equal to the difference between the first value and the actual value, the offset being positive if the first value is greater than the actual value, and negative if the first value is less than the actual value;
   if the offset value is positive, setting the tool cutting radius to an adjusted value, the adjusting value being the sum of the actual value and the offset value; and
   machining a further bore with the tool cutting radius at the adjusted value.

11. A method according to claim 10, further comprising the steps of:
   measuring, with the tool, the position of a calibration surface, by keeping the machine tool spindle stationary, adjusting the tool radius to bring the tool into a predetermined spatial relationship with the surface, and measuring the cutting radius of the tool upon attainment of the said relationship, thereby to establish a comparative measurement of the position of the calibration surface;
   measuring, with the machine, the position of the calibration surface, by bringing the spindle into a predetermined spatial relationship with the surface, and measuring the position of the machine spindle in a machine measurement system, upon attainment of said relationship thereby to determined an absolute measurement of the position of the calibration surface; and
   comparing the comparative and absolute measurements of the position of the calibration surface, and assigning to each comparative unit of measurement an absolute value of distance, thereby to enable adjustment of the cutting tool radius in terms of absolute values of distance.

12. A method of machining a bore of predetermined radius in a workpiece, using a rotary cutting tool mounted to the spindle of a machine tool, the cutting tool having an adjustable cutting radius and means for measuring the cutting radius, the method comprising the steps of:
   setting the tool cutting radius to a first value, the first value of cutting tool radius being smaller than the predetermined radius and being known relative to the predetermined radius;
   machining a first bore in a workpiece with the tool cutting radius at the first value;
   measuring, with the tool, the actual radius of the first bore by keeping the machine tool spindle stationary, adjusting the tool radius to bring the tool into a predetermined spatial relationship with the surface of the bore and measuring the cutting radius of the tool upon attainment of the said relationship;
   determining an offset value of radius equal to the difference between the first value and the actual value, the offset value being positive if the first value is greater than the actual value, and negative if the first value is smaller than the actual value;
   if the offset value is positive, setting the tool cutting radius to a second value the second value being the sum of:
   the first value;
   the difference between the first value and the predetermined radius; and
   the offset value;
   and machining a second bore with the tool cutting radius at said second value.

* * * * *